United States Patent [11] 3,579,968

[72] Inventors Fredrick L. Hill
 Rio Vista;
 Lauren W. Gates, Concord; William V.
 Colbert, Lodi, Calif.
[21] Appl. No. 769,053
[22] Filed Oct. 21, 1968
[45] Patented May 25, 1971
[73] Assignee The Regents of the University of California

[54] CROP HARVESTER ADJUSTABLE FOR DIFFERENT ROW SPACINGS AND FOR DIFFERENT TYPES OF FINIAL OPERATION
24 Claims, 15 Drawing Figs.
[52] U.S. Cl. ..................................... 56/327,
 171/14, 171/20, 171/130
[51] Int. Cl. ........................................ A01d 45/00
[50] Field of Search............................ 56/2, 19,
 228, 327, 3; 171/14, 17, 20, 43–47, 110, 130, 141,
 143; 198/87

[56] References Cited
UNITED STATES PATENTS
2,896,728 7/1959 Pridy.............................. 171/130
3,193,020 7/1965 Button........................... 171/14
3,199,604 8/1965 Lorenzen et al. ............... 171/20
3,331,198 7/1967 Hill et al. ....................... 171/14

Primary Examiner—Antonio F. Guida
Attorney—Owen, Wickersham and Erickson

ABSTRACT: A crop harvester with a basic unit comprising a wheel-supported main frame, crop-pickup means, separating means for detaching the crop from the bearing plants, a collecting conveyor for receiving the detached crop and moving it rearwardly, and a cross conveyor at the rear for moving the collected crop to one side of the harvester. To this basic frame are attached, removably and one at a time, (1) a direct-loading conveyor, (2) a manual sorting unit, and (3) a mechanical sorting unit. Pivotal attachment enables folding whichever attachment is mounted on the basic unit. The basic unit also has means for varying the distance between one rear wheel unit and another between a minimum said distance and a maximum said distance, to accommodate different row spacings and to enable support of the sorting units when they are attached.

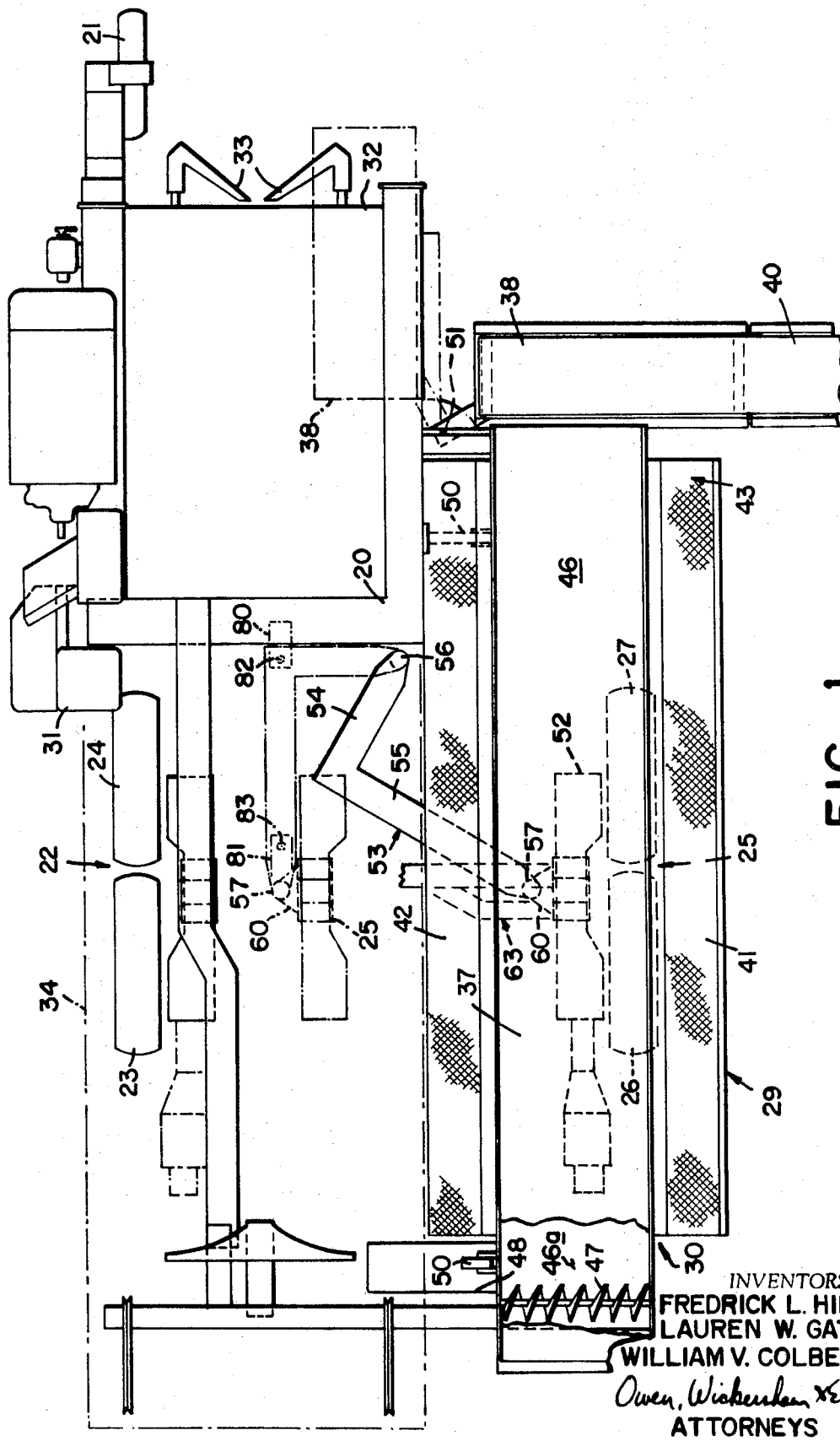

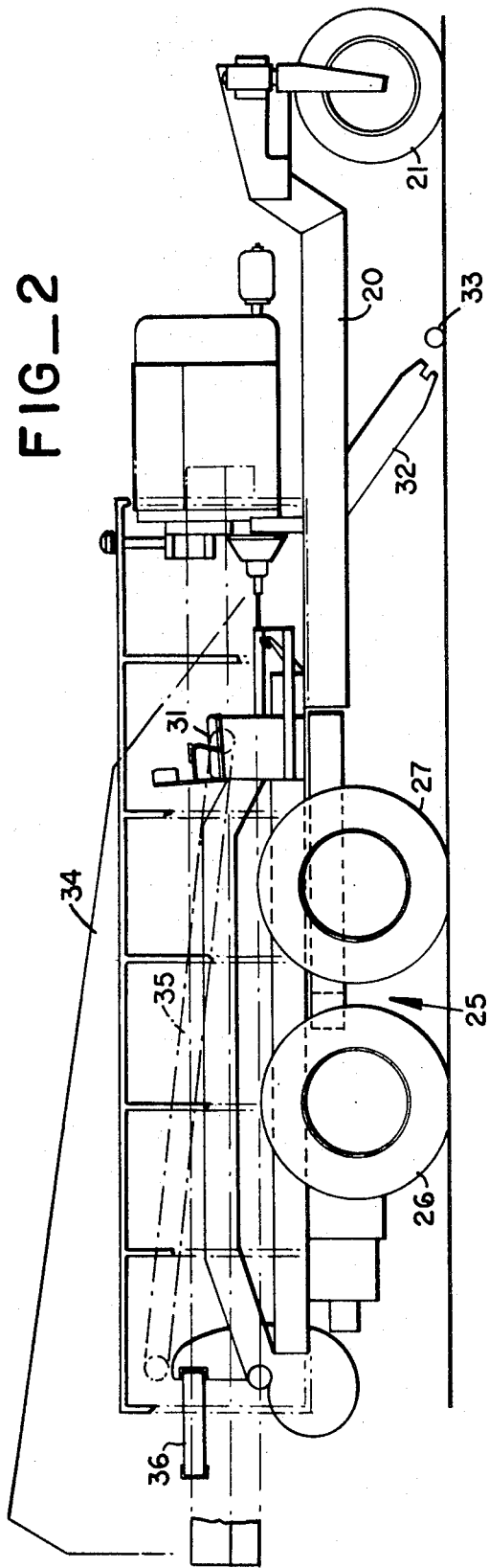
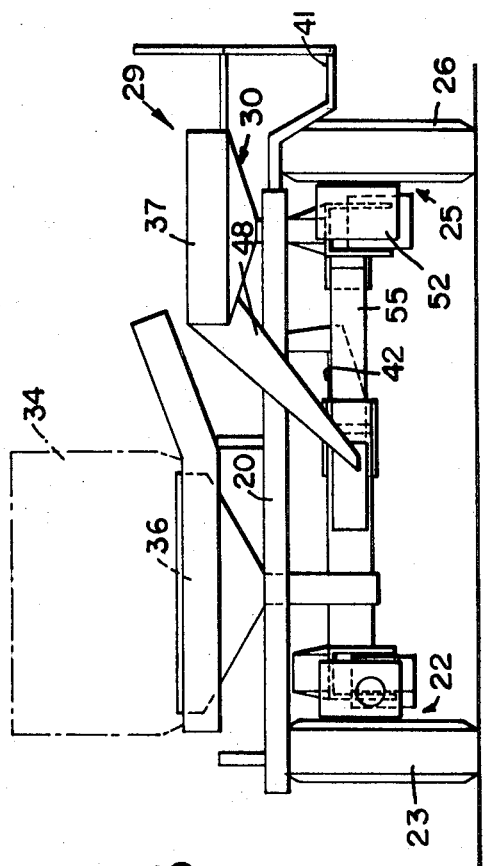

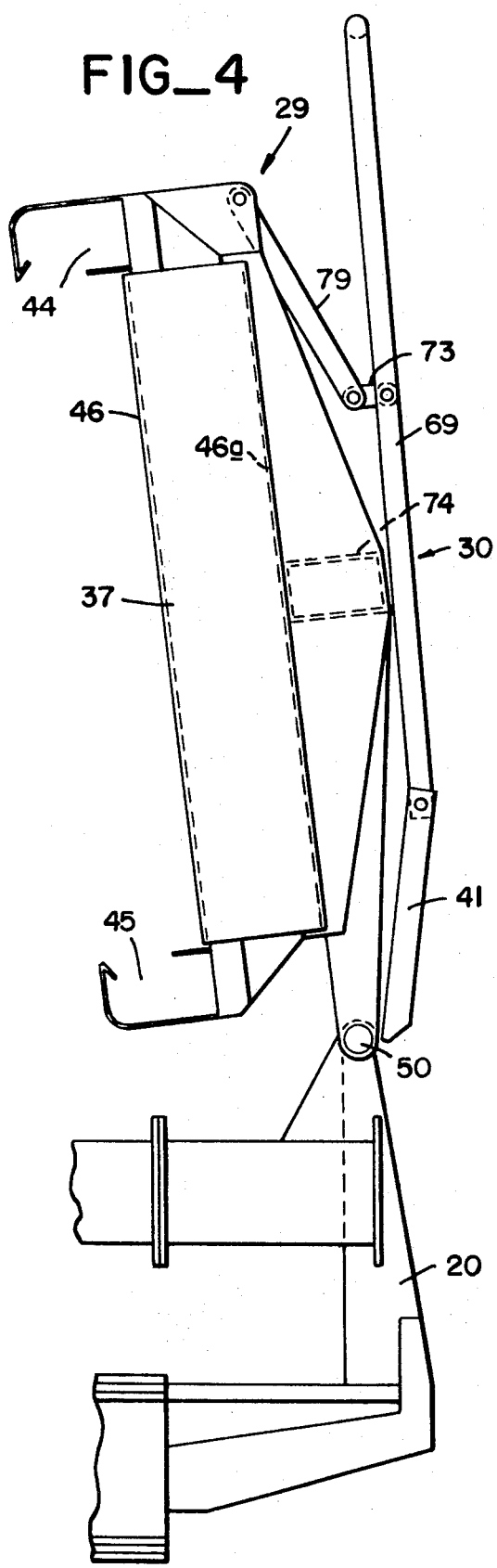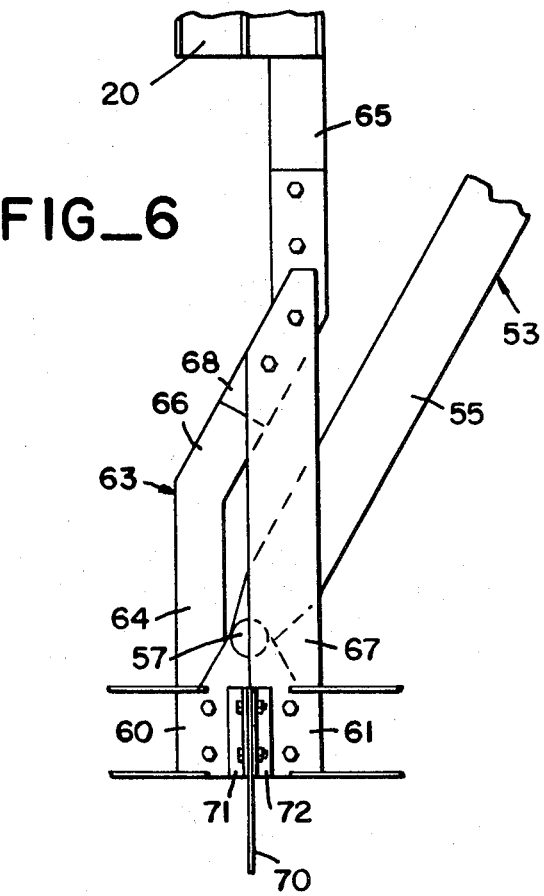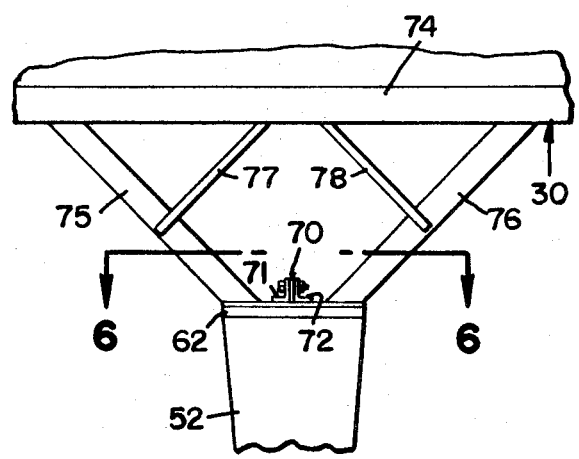

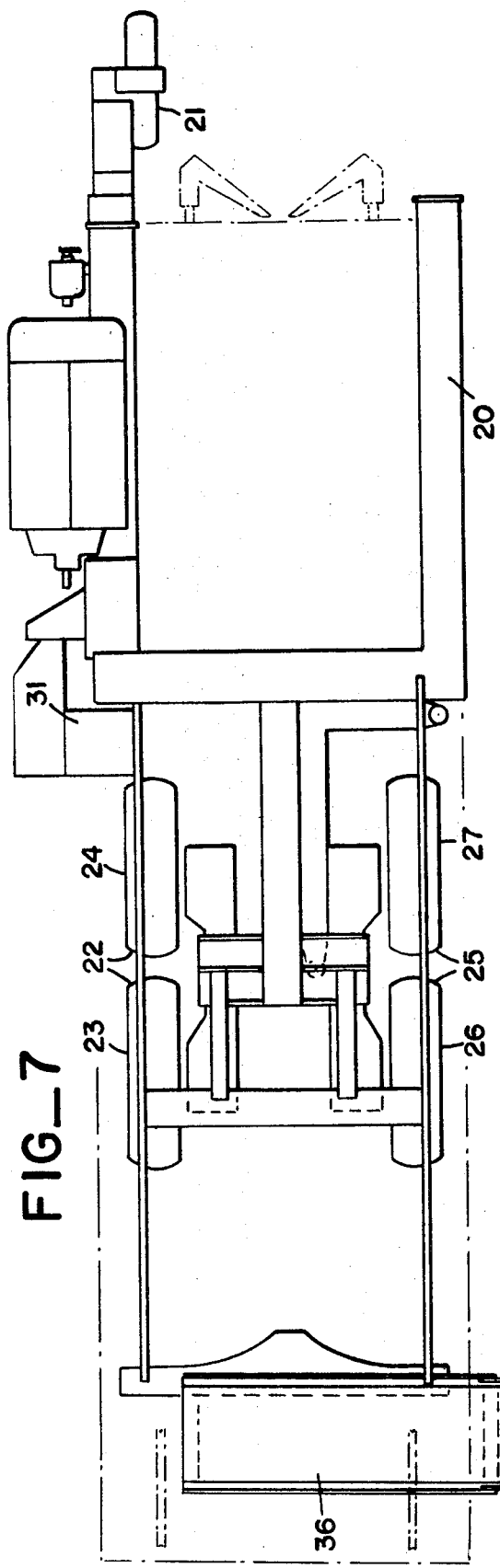
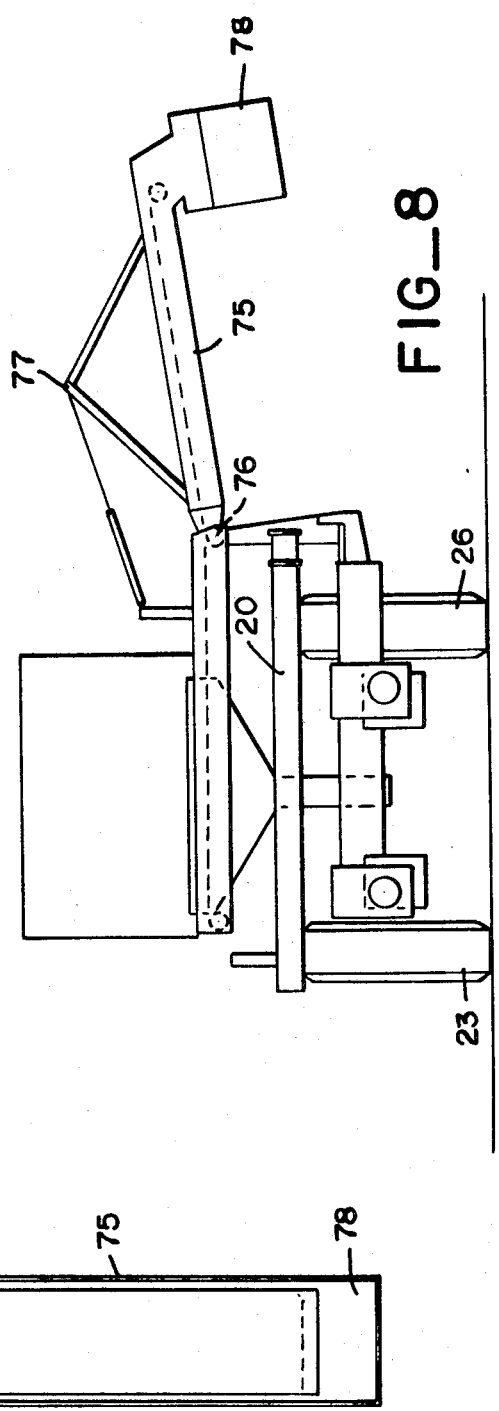

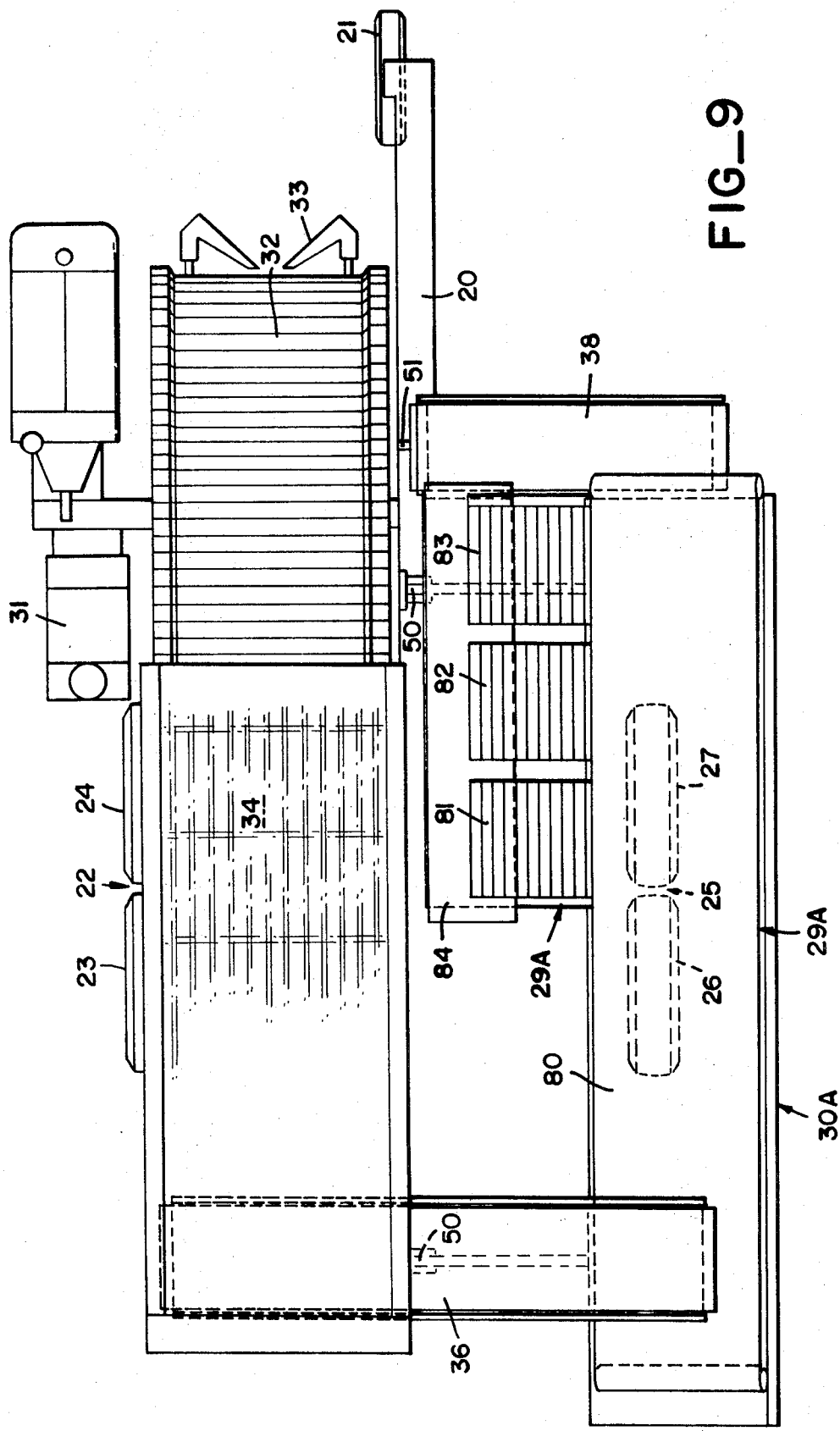

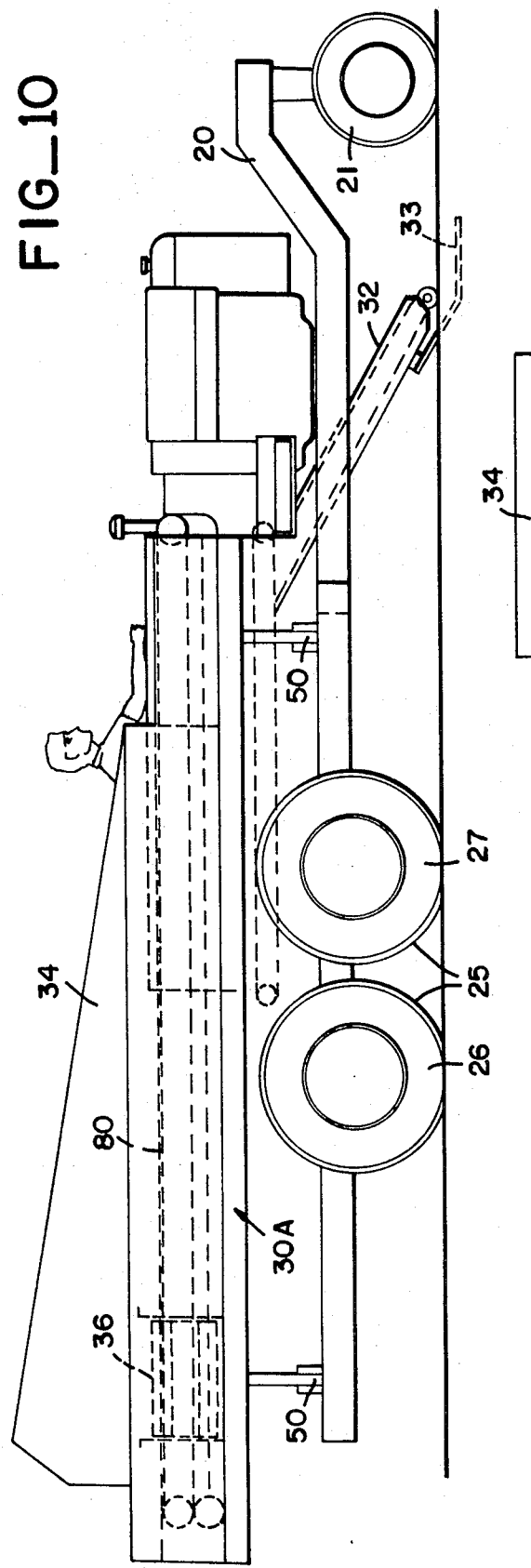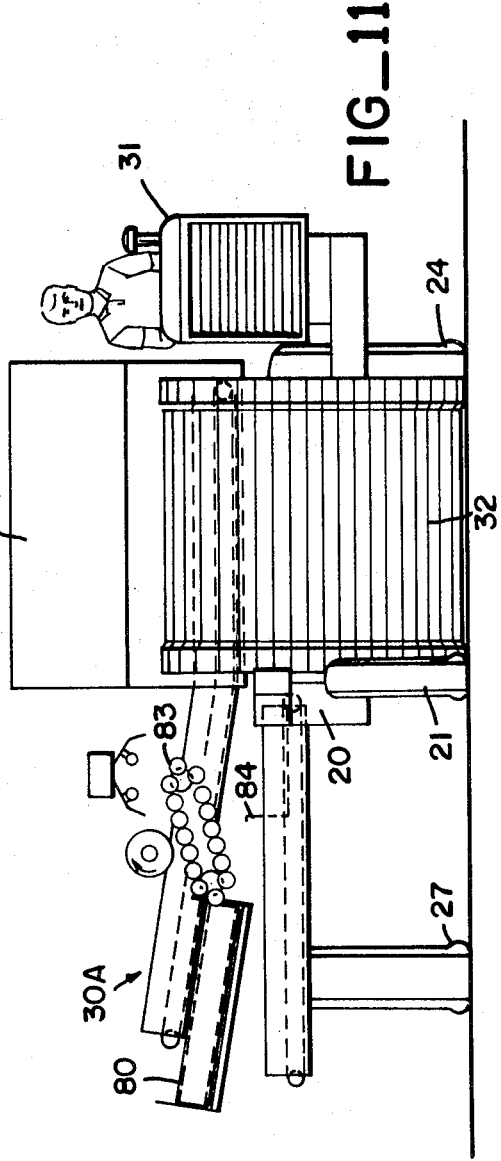

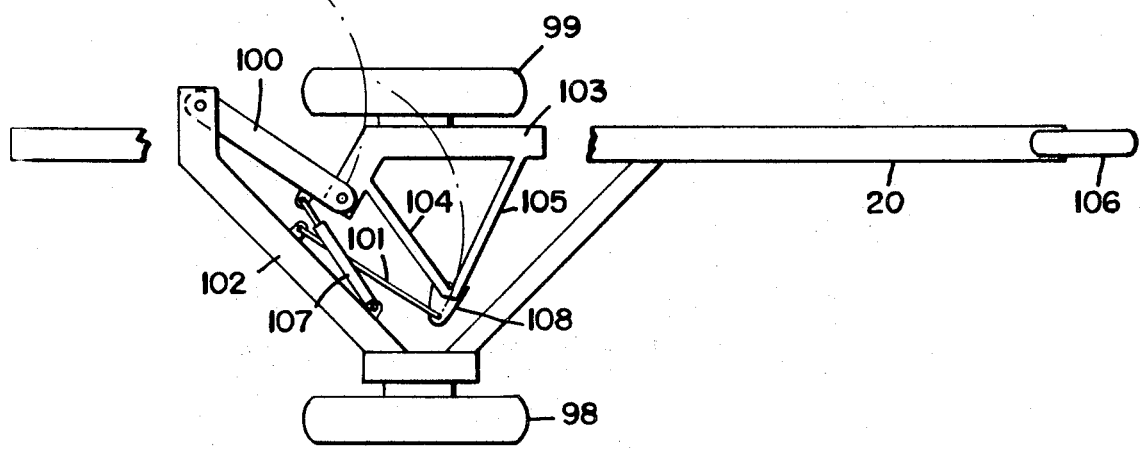
FIG_12
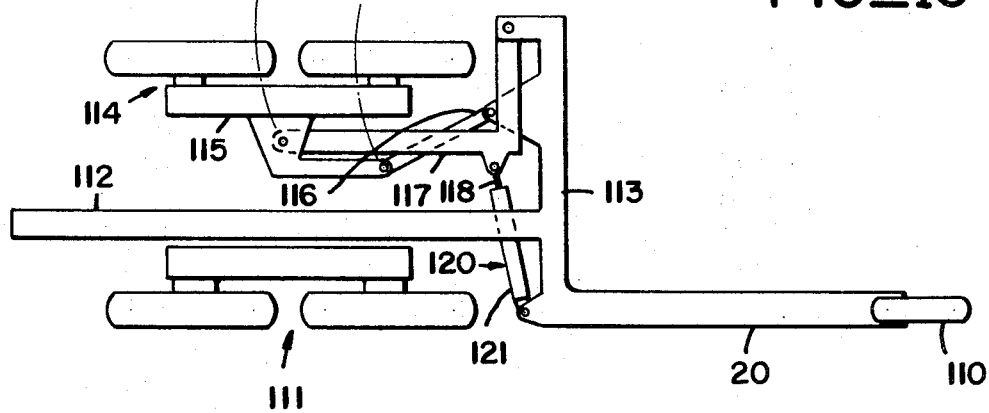
FIG_13

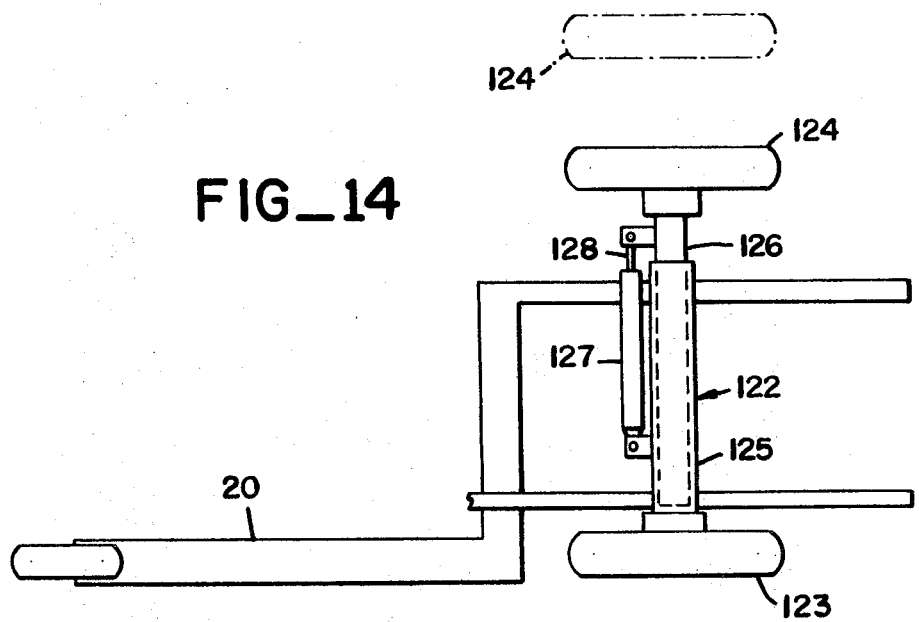
FIG_14
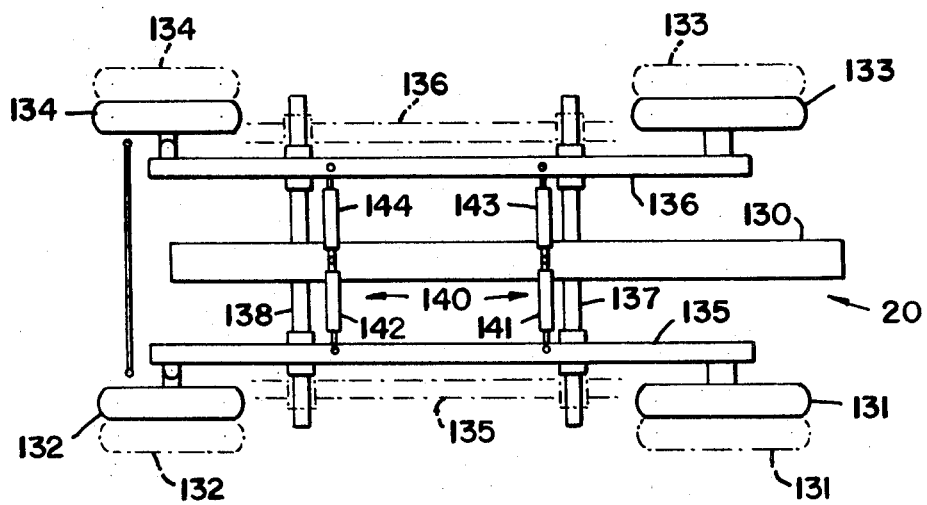
FIG_15

CROP HARVESTER ADJUSTABLE FOR DIFFERENT ROW SPACINGS AND FOR DIFFERENT TYPES OF FINIAL OPERATION

This invention relates to improvements in crop harvesters and applies particularly to machines used to harvest row crops such as tomatoes, cucumbers, cantaloupe corn, lettuce, carrots, and so on.

One group of problems to which this invention is addressed results from different row spacings in row crops. Sometimes row spacings which are good for one field are not economically desirable for another field. Sometimes the row spacings for a particular crop may be standard in one area, but often they are not, and there may be a wide variation. Also, in many instances the same harvester might be used for harvesting several different crops, and each of them may have a different row spacing so that it becomes difficult to adapt the same harvester to these differently spaced crops. Moreover, there is a trend to vary even further the row spacings rather than to standardize them, in order to maximize the crop yield per acre, which varies according to the soil, climate, and weather conditions normally encountered, as well as with types of planting and harvesting to be used. The recent trend indicates that in the near future there will be increased demand for harvesting machines whose tread can be quickly and conveniently altered.

The present invention is of particular interest in connection with these row-spacing problems because it adapts itself to an infinite adjustment of row spacings between a minimum spacing and a maximum spacing, while retaining proper wheel alignment, and because it enables the adjustment to be accomplished either by power or manually, depending on the extent to which the user is willing to pay for the convenience of a power-operated system.

Another problem to which this invention relates is that of more efficient manual sorting operations in the field. For example, in tomato harvesting, when the tomato plants have been severed and lifted, and the tomatoes have been separated from the plants and collected together, there still remains the problem of selecting those tomatoes which are acceptable to the canner and removing from them those which because of various types of blemishes or faults are not suitable. Thus, tomatoes with broken skins, undue ripeness, undue greenness, skin blemishes of certain types, and so on, must be culled out at some point and removed from the crop that is delivered to the canner. Otherwise, the canner may reject the entire delivery. Accurate sorting, therefore, is very important.

When the sorting is performed on harvesters, it has been conventional to have two or three distinct groups of manual sorters. In the best harvesters heretofore there have been two such groups, one on each side of the harvester, and in some other harvesters there has been a third group located in front of the other two groups on a different axis. This separation into two or three teams has made it difficult for one man to supervise and control all the sorters. Often a field superintendent or crew chief rides on the harvesting machine, and he can greatly raise the ultimate crop yield and improve its economical value by properly supervising the sorters; he makes sure that all sorters work at a speed commensurate with the speed of the machine and can order adjustment of the machine speed to that of the harvesters; he watches the rejection habits of every sorter and helps them to improve those habits so that no sorter rejects too many of the satisfactory tomatoes nor permits too many unsatisfactory ones to pass by. This constant check upon the work habits and efficiency of all sorters can become very important. However, it is difficult for such a crew chief or field superintendent to watch simultaneously two or three different rather widely separated groups. Thus, he can usually see only one group at a time well enough. It is practically impossible to watch all three such groups at once, and it is very difficult to watch simultaneously two groups when they are on opposite sides of the machine, because the separating portion of the machine rises high in the center in between these two groups and may completely obscure one group or the other from his view, depending on where he himself is standing. If he stands high enough to see both groups, his view is either obscured by some other part of the machine, or the view itself is at a bad angle; in fact it may simply be impossible to do this due to the sun-shading equipment often installed on the machines. Furthermore, the two groups may not be evenly balanced, and there is little that can be done to achieve balance, since they work from different streams of fruit, which may not be anything like uniform in amount.

The present harvester, therefore, departs from the former sorting schemes and locates all the sorters on one side of the harvester. As in the best harvesters in use heretofore, the stream being sorted preferably moves countercurrently to the separating stream, although that need not always be so, but in any event, all the sorters are located to one side of the separating stream, preferably closely adjacent to it. With manual harvesting there still may be two rows of sorters, one on each side of a forwardly moving conveyor, but both of these rows work from the single forwardly moving conveyor and are therefore readily visible to a single man at the front end of that conveyor; so they are more easily supervised. An advantage of this system is that there is not such a difference as sometimes occurs when there are two sorting streams of fruit, where one stream may be relatively heavy while the other one is relatively light. In the present invention, the entire crop is moved to one side and moves along a single sorting conveyor; it is so transferred that there is a relatively evenly distributed single stream, and balance is easily achieved.

When the sorting stream is at one side only of the harvester, the harvester is usually too wide to be moved on a highway or carried on a truck and takes up too much room on storage. The present invention solves this problem also by providing a harvester in which the sorting assembly is foldable in against the main frame to narrow the overall width of the harvester during nonuse conditions. Moreover, it provides proper support for the unit by providing that a wheel or tandem unit of wheels directly support the sorting unit. The wheel or tandem assembly is adjustable in position so that it can accommodate any desired spacing of rows in the field, so that the wheel will not run over plants but will run in between them at the proper intervals.

Another problem to which this invention relates is that of adapting a standard harvester to different systems. The purchaser wants a harvester that can be adapted in several different systems without his having to buy a separate harvester for each of these systems. For example, three types of sorting are either already in use or are about to become available for sorting row crops such as tomatoes. One of these is the manual sorting on the harvester already discussed, and presently most often used. Another type of sorting in the field which apparently may become important soon—though no one yet knows for sure—is that of mechanical sorting, in which the sorting is done electronically or otherwise, as by color or reflectance characteristics and in which only a couple of supervisors need go along while the machine is in the field. There is then no team of manual sorters. A third type of sorting, already in use, is central sorting. In central sorting, the tomatoes are not sorted in the field, either mechanically or manually. Instead all the tomatoes that are separated from the plants are transferred into large bins which are delivered to a central station and placed there on special sorting belts where the sorting is presently done by large teams of manual sorters, though some day this may be done mechanically. There are some objections to central sorting, inasmuch as it apparently subjects the tomatoes to more likelihood of damage and therefore may tend to reduce the overall yield of the crop. There are also, however, some advantages in that a single large and experienced team of sorters may be developed and may be carefully supervised, and these advantages may overcome the disadvantages and give a net increase in yield, or at least some farmers so believe.

The present invention relates to this problem by providing a row-crop harvester which is readily adapted for central sorting by providing a main unit to which can be attached any of three different assemblies: (1) a direct output conveyor leading from the separating station without any sorting at all, where central sorting is desired, so that no field sorting apparatus need be purchased and so that the field sorting unit, if purchased, can be omitted from the machine during central-sorting operation. (2) A manual side sorting unit can be added as a separately purchasable unit or sold in place of the direct output. It is readily adapted to the machine and readily installed on it. (3) A mechanical sorting unit can be purchased instead of or in addition to either of the units (1) and (2), as the customer desires. The farmer can even change from one type to another and may have all three systems available if he so desires, or he may have only one of the systems and not have to pay for any of the others. Thus, the machine individually is versatile, and also the machine setup is versatile so that the purchaser need not purchase things which he is not going to use; yet if he changes his mind or adds a new type of operation he can do so without having to purchase a completely new machine.

Other objects and advantages of the invention will appear from the following description of some preferred embodiments thereof.

In the Drawings:

FIG. 1 is a plan view of a row-crop harvesting machine embodying the principles of the present invention and shown adapted for manual sorting in the field. Some parts are omitted here that are shown in FIG. 9 and vice versa. Here, the separator unit, collecting conveyor, and rear cross conveyor are omitted, the outlined area of the separator being shown in dot-dash lines. Alternative, folded-in positions of the front side conveyor and of the frame for the right rear wheel unit and its crank-arm are shown in broken lines.

FIG. 2 is a view in side elevation of the machine of FIG. 1, showing the walls of the separator and also the collecting and rear cross conveyor.

FIG. 3 is a view in rear elevation of the machine of FIG. 2.

FIG. 4 is a fragmentary view in end elevation of one side of the harvester of FIGS. 1—3 with the sorting assembly folded up against the side of the separating unit.

FIG. 5 is a fragmentary view in side elevation of the support for the sorting assembly with that assembly down in harvesting position.

FIG. 6 is a fragmentary view in section taken along the line 6—6 in FIG. 5 showing how the rear-wheel truck is locked in its outer position.

FIG. 7 is a view similar to FIG. 1 of a direct-loading harvester, embodying only a replacement of the manual sorting unit with a direct-loading attachment, the right rear wheels being retracted under the main frame, corresponding to the broken-line position of FIG. 1.

FIG. 8 is a view in rear elevation of the harvester of FIG. 7.

FIG. 9 is a top plan view of a machine like that of FIG. 1 except that the manual sorting unit is replaced by a mechanical sorting unit, and, for purposes of illustration, the front wheel is relocated.

FIG. 10 is a view in side elevation of the machine of FIG. 9.

FIG. 11 is a view in front elevation of the machine of FIGS. 9 and 10.

FIG. 12 is a diagrammatic plan view of a power means for adjusting the distance between the rear wheels of a three-wheel row-crop harvester, the left rear wheel being shown at a minimum spacing in solid lines and at maximum distance in broken lines.

FIG. 13 is a similar view showing another system where there is one front wheel and two rear tandem units, the left rear tandem unit being shown in solid lines at minimum spacing from the right rear tandem unit and being shown in broken lines at the maximum spacing.

FIG. 14 is a similar view of a modified system for a three-wheel harvester, the right rear wheel in this instance being the movable one.

FIG. 15 is a similar view of a four-wheel harvester in which all four wheels move to vary the distance between the wheels. The minimum spacing is shown in solid lines and a different, not necessarily maximum, spacing is shown in dot-dash lines.

The drawings are simplified in order to exclude needless details which might tend to obscure the inventive features rather than to disclose them. After all, the basic harvesters are now well known.

The machines shown in FIGS. 1—6, FIGS. 7 and 8, and FIGS. 9—11 differ only in that the first machine (FIGS. 1—6) has a manual sorting system, the second machine (FIGS. 7 and 8) has no sorting system, but is a direct-loading machine, and the third machine (FIGS. 9—11) has a mechanical sorting system, so the views help to complement each other, some of them showing different portions that remain constant. They may be taken as one basic machine to which three different attachments have been applied, one at a time. In each of them, a main frame 20 is mounted on three sets of wheels, a front wheel 21, a left rear tandem unit 22 having wheels 23 and 24, (the unit 22 for the purposes of this invention is shown as remaining in a standard position relative to the frame 20), and a right rear tandem-wheel unit 25 having wheels 26 and 27, the unit 25 being movable both for adjustment to row spacing and to enable folding of a manual sorting unit 29 having a frame 30 in FIG. 1 or proper support thereof or of a mechanical sorting unit 29A having a frame 30A in FIG. 9.

The main frame 20 carries a driver station 31 and a crop pickup means 32 in front of which is a cutting assembly 33. The pickup means 32 picks up the crop after the plants have been severed and lifts them gently with a minimum of motion to a separator 34 (see FIGS. 2, 3 and 9) which may be any of various types of separators presently in use, though preferably they are that shown in U.S. Pat. No. 3,252,464 or in application Ser. No. 725,874, filed May 1, 1968, both of which involve means for simultaneously moving the plants fore and aft and up and down to shake off the fruit. Beneath the separator 34 is a collecting conveyor 35 (see FIG. 2) which catches the separated crop and moves it up and to the rear parallel to and beneath the separator 34. At the rear of the separator 34 the chaff or other parts of the crop which are not recovered are deposited on the ground, and at the rear, also, transfer is made from the recovery or collecting conveyor 35 to a sideward moving rear conveyor 36 (see FIGS. 2 and 3).

In the device of FIGS. 1—6, this sideward moving rear conveyor 36 transfers the recovered crop to a frontwardly moving sorting conveyor 37, which is carried on the frame 30 as part of the sorting unit 29 and is supported by the right rear-wheel tandem unit 25. The frontwardly moving sorting conveyor 37 carries the crop to a front sidewardly moving conveyor 38, the conveyor 37 passing between two teams of sorters standing or seated on two platforms 41 and 42 (see FIG. 1), supported by the frame 30. The conveyor 38 transfers the sorted crop to an output conveyor 40 (see FIG. 1). The two rows of workers, one on each side of the conveyor 37, operate as a single team, and a supervisor may stand or sit at a station 43 (FIG. 1) where he can see both rows of sorters simultaneously.

The sorting unit is provided with a pair of cull chutes 44 and 45 (see FIG. 4), one on each side of the forwardly moving sorting conveyor 37, and the chutes 44 and 45 guide the tomatoes which are removed as culls from the top flight 46 of the conveyor to deposit them on the top surface of the rearwardly moving lower flight 46a of the sorting conveyor 37. This lower flight 46a carries them to the rear, where a sidewardly moving screw conveyor 47 delivers them to a disposal chute 48, which in turn dumps them on the ground along with the plants which are simultaneously being deposited on the ground by the separator 34. This system prevents the tomatoes from falling on top of tomato plants that have not yet been harvested.

The sorting unit 29 is adapted to be folded against the side of the separator 34 by being mounted for a swinging vertically on a pair of horizontal pivots 50. When brought into the position shown in FIG. 4, the sorting unit 29 does not increase the width which the harvester would have without the unit 29, and therefore the machine is able to operate as a normal width device. Also, as shown in FIG. 1, the front conveyor 38 is mounted on a vertical pivot 51 for folding in sideways to the dot-dash position above the pickup conveyor 32 when not in use, to complete the reduction of the width of the machine. The output conveyor 40 which extends beyond the conveyor 38 is preferably taken off before folding in the conveyor 38.

When the tomato harvester is thus arranged into its narrower position, the right rear tandem-wheel unit 25 is moved to its inner or retracted position shown in broken lines in FIG. 1 (the wheels themselves not being shown in this position). The tandem-wheel unit 25 includes a truck 52 supported by a right-angle arm 53 having a short portion 54 and a longer portion 55. The portion 55 is connected by a pivot 57 to the truck 52, whereas the portion 54 is connected by a vertical pivot 56 to a main frame 20. Movement from one extreme position to another is done manually, and when in either extreme position, the arm 53 is locked, the mechanism for locking it in the outer or harvesting position being shown in FIG. 6 and that locking it in the inner or transporting position being shown in FIG. 1.

When the sorting unit 29 is in the position shown in FIG. 3, ready for sorting, then the right rear tandem-wheel unit 25 is brought out as shown in FIG. 3 and as shown in the outer position in FIG. 1 and when there, two plates 60 and 61 are bolted to a top surface or pad 62 of the truck 52 (see FIGS. 5 and 6). To the plate 60 is secured a beam 63, which has two transverse portions 64 and 65 joined by an offsetting angular portion 66. The portion 65 is connected to the frame 20. The other plate 61 is part of another beam 67 located above the beam 65 but bolted to it through an intermediate member 68. This locks the truck 52 in the outer position. The truck 52 cannot be moved to its inner position nor can the arm 53 be swung about the pivot 56 until the plate 61 and its beam 67 and the beam 63 are removed.

The platform 41 is supported partly by a bar 70 which is secured between flanges 71 and 72 after plates 60 and 61 when the machine is in the position shown in FIG. 3. The platforms 41 and 42 may be removed from the machine and stowed in the separator unit 34 or elsewhere, or they may be folded in, as shown in FIG. 4, where a railing 69 is pivoted both to the platform 41 and to a bar 79 by a link 73. The frame 30 includes a box beam 74, which, when the unit 29 is down, is supported over the truck 52 and the plates 60 and 61 by braces 75, 76, 77 and 78 (FIG. 5).

When the unit 29 is folded, the wheel set 25 is moved in by unbolting and removing the beams 63 and 67 and by locking plates 80 and 81 (see FIG. 1) which are secured, respectively, to the frame 20 and the plate 60, to the arms 54 and 55, by pins 82 and 83.

As stated earlier in the specification, it is desirable to have the harvester readily convertible either at the time of purchase or later so that the farmer can use it either for a hand sorting operation, a mechanical sorting operation, or for a direct loading operation, as in connection with central sorting. FIGS. 7 and 8 show that the harvester of FIGS. 1—3 is readily converted to a direct loading operation simply by removing the sorting unit 29 and by adding on to the frame 20 and rear cross conveyor 36 a direct output conveyor 75. This output conveyor 75 may be connected by a pivot 76 to the rear cross conveyor 36 and may be supported also by chains 77 and other supporting device by the main frame 20 of the harvester. At its output end a fruit depositing device 78 such as one covered by U.S. Pat. No. 3,187,872 or by U.S. Pat. No. 3,348,647 may be provided. In this form of the device the tomatoes or other fruit or crop, once separated, are transferred by the collecting conveyor 35 to the rear cross conveyor 36, which delivers them directly to the output conveyor 75, and the tomatoes leave through the fruit depositing device 78 and go to the bin of a truck riding beside the harvester.

The system of FIGS. 9—11 differs from that of FIGS. 1 to 3 in that the manual sorter 29 is replaced by a mechanical sorting unit 29A having a frame 30A and a different conveyor belt 80 leading to three mechanical sorting units 81, 82, 83, none of which are shown in detail, because the particular mechanical sorting means is not a part of this invention. The units 81, 82, and 83 act to transfer the useful crop to another forwardly moving conveyor 84 which, in turn, transfers them to the sidewardly moving front conveyor 38 whence they go by a suitable boom conveyor 40, not shown here but as in FIG. 1, to a collecting bin or truck. The frame 30A of FIGS. 9 to 11 is mounted substantially identically to the mounting of the frame 30 of FIGS. 1 to 6, using the same pivots 50 for folding it up against the main frame 20, and the wheels are the same as shown in FIGS. 1—3, for moving out and in as needed.

As stated before, there are several ways of providing for adjustment of the wheel spacing of the rear wheels while maintaining proper wheel alignment. In FIGS. 1—6 the right tandem-wheel unit 25 is adjusted manually. As shown in FIG. 12, a power system may be used instead to vary the distance between two rear wheels 98 and 99. Parallel links 100 and 101 are pivoted to a frame member 102, which is a portion of the main frame 20. One link 100 is pivoted directly to a frame member 103 that supports the adjustable rear wheel 99, while the axle in the other rear wheel 98 is held in a fixed position by the frame 102. The link 101 is connected to a juncture member 108 which is joined by two separate rigid links 104 and 105 to the wheel frame 103, the members 103, 104, and 105 defining a triangle. The frame 20 carries the front wheel 106. A hydraulic cylinder 107 is secured pivotally to the frame member 102 and its piston rod 109 is pivotally secured to the links 100. Movement of the piston in the hydraulic cylinder 107 enables the vehicle operator to move the rear wheel 99 by power from one rear wheel position (solid lines) to a second rear wheel position (broken lines). Not only the extreme positions but any intermediate position may be maintained.

The construction shown in FIG. 13 is an alternative system which is used in this case to move a tandem wheel arrangement by power in a manner generally similar to that shown in FIG. 12 but differing in details. In this installation the front wheel 110 is directly in line with the right-hand wheel tandem unit 111, and pertinent parts of the main frame 20 are shown, including a forwardly and rearwardly extending portion 112 and a transverse portion 113. A movable left rear wheel tandem unit 114 is supported by a separate frame 115, and the frame 115 is supported by a pair of two links 116 and 117. The link 117 is L-shaped and is connected to the connecting rod 118, of a hydraulic cylinder and piston assembly 120. The cylinder 121 of the assembly is secured at its fixed end to the frame 20. Again, power means acts through the links 116 and 117 to move the tandem unit frame 115 out, and therefore the right rear wheels can be moved to any position.

The structure of FIG. 14 is somewhat different. In this operation there is a telescoping axle system 122 by which the left-hand rear wheel 123 and right-hand rear wheel 124 are maintained in a coaxial position, though they are not driven from the same axle, but their two axles 125 and 126 telescope one within the other. A hydraulic cylinder 127 is mounted parallel to the axles 125 and 126 and is secured at one end to the axle 125, while the connecting rod 128 of the piston is secured at its end to the inner axle 126 and operates to spread the two wheels apart when the hydraulic system is actuated by the driver.

FIG. 15 shows a system for power operation for a four-wheel harvester with the main frame 20 having a member 130 extending down the middle and with wheels 131, 132 and 133, 134 at each side of the machine in a four-wheel arrangement. Here, there may be two frames 135 and 136, one for each side, which slide on laterally extending members 137 and 138 extending through lateral guides. In other words, the front wheel 131 and rear wheel 132 on the left side are supported on one frame 135 and the front wheel 133 and rear wheels 134 of the right side are supported by another frame 136 and both these frames are movable with respect to the main frame. A hydraulic cylinder arrangement 140 may then be applied, in which there are two hydraulic cylinders 141, 142 and 143, 144 on each side retained in parallel position and adapted to operate simultaneously to keep that parallelism. One set is moved to move the left-hand wheels 131, 132, and the other is moved to move the right-hand wheels 133, 134. Both may be operated simultaneously to maintain the main frame at the center of the machine or either one may be operated if that is not necessary or desirable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting. It may be noted, for example, that the invention includes, in addition to the species disclosed wherein the mechanical sorting device is located between two conveyors 36 and 84, (the conveyor 36 serving as a preinspection station and the conveyor 84 serving as a post-inspection station) other similar systems where the conveyor 84 may move laterally instead of forwardly, and systems where the collecting conveyor 35 delivers off its forward end to a lateral conveyor like the conveyor 36 for preinspection, which may feed rearwardly to the mechanical sorter or may feed a longitudinal inspection and manual sorting conveyor.

We claim:

1. A crop harvester comprising
a main frame supported by wheels,
crop-pickup means on said main frame,
separating means on said main frame for detaching the crop from the bearing plants,
a collecting conveyor on said main frame for receiving the detached crop and moving it rearwardly,
a cross conveyor at the rear of said frame for receiving the crop from the collecting conveyor and moving it all to one side only of said harvester,
said main frame, crop-pickup means, separating means, collecting conveyor and cross conveyor being elements of a basic unit,
attachment means on one side of said main frame enabling pivotal attachment to said basic unit,
a manual sorting unit attached to said basic unit by said attachment means for receiving the crop from said cross conveyor and including a forwardly moving conveyor generally parallel to said separating means and positioned at one side only of said main frame and two sorter platforms, one on each side of said forwardly moving conveyor, and a front delivery conveyor, so that one said sorter platform lies between said forwardly moving conveyor and said separating means, and
said attachment means including means enabling the folding relative to said basic unit of said sorting unit for thereby narrowing the overall width of said harvester when it is not harvesting, said attachment means also including means for enabling removal of said sorting unit.

2. A crop harvester comprising
a main frame supported by wheels,
crop-pickup means on said main frame,
separating means on said main frame for detaching the crop from the bearing plants,
a collecting conveyor on said main frame for receiving the detached crop and moving it rearwardly,
a cross conveyor at the rear of said frame for receiving the crop from the collecting conveyor and moving it to one side of said harvester,
said main frame, crop-pickup means, separating means, collecting conveyor and cross conveyor being elements of a basic unit, and
attachment means on one side of said main frame enabling pivotal attachment to said basic unit, one at a time, of any of various types of auxiliary units,
said basic unit having at least three sets of wheels, each set having a separate wheel frame, supporting at least one wheel, two of said sets being rear wheels, and means for varying the distance between a first said rear wheel frame and the other said rear wheel frame between a minimum said distance and a maximum said distance, while maintaining substantial alignment of the axle line of said two rear wheel sets,
said first said wheel frame being moved to approximately said maximum distance when a certain type of said auxiliary unit is attached to said basic unit and is in unfolded position for harvesting, to give direct support for said auxiliary unit.

3. The harvester of claim 2 wherein said means for varying comprises a pivoted arm connecting said first rear wheel frame to said frame means, and means for locking said arm in any of a plurality of desired positions.

4. The harvester of claim 2 wherein said means for varying includes a parallel link support means for said first rear wheel frame and piston-cylinder means for determining the distance between said first and other rear wheel sets and for retaining them at said distance.

5. The harvester of claim 2 wherein said means for varying comprises having said rear wheel frames mounted along two telescoping transverse shafts, and power means for moving the shafts apart and toward each other.

6. In a row-crop harvester having a main frame supported by wheels and supporting crop pickup means at a front end followed by and in line with separating means for separating the edible crop from the remainder of the plant and discarding said remainder, and collecting means for collecting the separated edible crop and moving it toward the rear of the harvester, the combination therewith of
a rear cross conveyor supported by said main frame for receiving the harvested crop from said collecting means and moving it transversely to one side only of said harvester, beyond said collecting conveyor and separating means,
forwardly moving conveyor means entirely to one side of said harvester for receiving said crop from said rear cross conveyor and moving it forwardly,
a sorting station associated with said forwardly moving conveyor means, where culls and trash are removed, having sorting platforms on both sides of said forwardly moving conveyor means, and
a front side conveyor to which the sorted crop is delivered for moving the crop transversely to a delivery point.

7. In a row-crop harvester having a main frame supported by wheels and supporting crop pickup means at a front end followed by and in line with separating means for separating the edible crop from the remainder of the plant and discarding said remainder, and collecting means for collecting the separated edible crop and moving it toward the rear of the harvester, the combination therewith of
a rear cross conveyor supported by said main frame for receiving the harvested crop from said collecting means and moving it transversely to one side only of said harvester, beyond said collecting conveyor and separating means,
forwardly moving conveyor means entirely to one side of said harvester for receiving said crop from said rear cross conveyor and moving it forwardly,
a sorting station associated with forwardly moving conveyor means, where culls and trash are removed,
a front side conveyor to which the sorted crop is delivered for moving the crop transversely to a delivery point, and
said forwardly moving conveyor means and sorting station both being mounted on a sorter frame that is supported pivotally relative to said main frame along a horizontal longitudinally extending pivot line for folding said sorter frame upwardly against the side of said main frame when the harvester is being transported or stored.

8. The harvester of claim 7 wherein at least one of the wheels supporting said harvester is supported by a wheel frame that is movable from a position beneath said main frame where it directly supports said main frame to a position beneath said sorter frame when the sorter frame is folded down for use, for direct support by said wheel frame of said sorter frame.

9. The harvester of claim 7 wherein said front side conveyor is mounted pivotally to said main frame about a vertical pivot for swinging in to a position over and generally parallel with said crop pickup means.

10. In a row-crop harvester having a main frame supported by wheels and supporting crop pickup means at a front end followed by and in line with separating means for separating the edible crop from the remainder of the plant and discarding said remainder, and collecting means for collecting the separated edible crop and moving it toward the rear of the harvester, the combination therewith of
   a rear cross conveyor supported by said main frame for receiving the harvested crop from said collecting means and moving it transversely to one side only of said harvester, beyond said collecting means and separating means,
   a single forwardly moving conveyor entirely to one side of said harvester for receiving said crop from said rear cross conveyor and moving it forwardly,
   a sorting platform along each side of said forwardly moving conveyor, where culls and trash are manually removed, and both platforms lying on one side of said frame and parallel thereto, with one said platform between said conveyor and said separating means, and
   a front side conveyor to which the sorted crop is delivered for moving the crop transversely to a delivery point.

11. In a row-crop harvester having a main frame supported by wheels and supporting crop pickup means at a front end followed by and in line with separating means for separating the edible crop from the remainder of the plant and discarding said remainder, and collecting means for collecting the separated edible crop and moving it toward the rear of the harvester, the combination therewith of
   a rear cross conveyor supported by said main frame for receiving the harvested crop from said collecting means and moving it transversely to one side only of said harvester, beyond said collecting conveyor and separating means,
   a forwardly moving conveyor entirely to one side of said harvester for receiving said crop from said rear cross conveyor and moving it forwardly,
   a sorting platform along each side of said forwardly moving conveyor, where culls and trash are manually removed,
   a front side conveyor to which the sorted crop is delivered for moving the crop transversely to a delivery point, and
   said forwardly moving conveyor and sorting station both being mounted on a sorter frame that is supported pivotally relative to said main frame along a horizontal longitudinally extending pivot line for folding said sorter frame upwardly against the side of said main frame when the sorter is not being used, to narrow the width of said harvester.

12. The harvester of claim 11 wherein at least one of the wheels supporting said harvester is supported by a wheel frame that is movable from a position beneath said main frame where it directly supports said main frame to a position beneath said sorter frame when the sorter frame is folded down for use, for direct support by said wheel frame of said sorter frame.

13. The harvester of claim 11 wherein said front side conveyor is mounted pivotally to said main frame about a vertical pivot for swinging in to a position over and generally parallel with said crop pickup means.

14. The harvester of claim 10 wherein said forwardly moving conveyor has a rearwardly moving lower flight and along each edge of said forwardly moving conveyor there is a cull chute for dropping removed culls and trash onto the top of said lower flight, a disposal chute at the rear of said conveyor, and transfer means for transferring culls and trash from said lower flight to said disposal chute.

15. In a row-crop harvester having a main frame supported by wheels and supporting crop pickup means at a front end followed by and in line with separating means for separating the edible crop from the remainder of the plant and discarding said remainder, and collecting means for collecting the separated edible crop and moving it toward the rear of the harvester, the combination therewith of
   a rear cross conveyor supported by said main frame for receiving the harvested crop from said collecting means and moving it transversely to one side only of said harvester, beyond said collecting conveyor and separating means,
   a first forwardly moving conveyor entirely to one side of said harvester for receiving said crop from said rear cross conveyor and moving it forwardly,
   a mechanical sorting unit entirely to one side of said harvester between said forwardly moving conveyor and said separating means, where culls and trash are removed and discharged on the ground,
   a second forwardly moving conveyor between said mechanical sorting unit and said separating means for receiving the sorted crop from said mechanical sorting unit, and
   a front side conveyor to which the sorted crop is delivered for moving the crop transversely to a delivery point.

16. In a row-crop harvester having a main frame supported by wheels and supporting crop pickup means at a front end followed by and in line with separating means for separating the edible crop from the remainder of the plant and discarding said remainder, and collecting means for collecting the separated edible crop and moving it toward the rear of the harvester, the combination therewith of
   a rear cross conveyor supported by said main frame for receiving the harvested crop from said collecting means and moving it transversely to one side only of said harvester, beyond said collecting conveyor and separating means,
   a first forwardly moving conveyor entirely to one side of said harvester for receiving said crop from said rear cross conveyor and moving it forwardly,
   a mechanical sorting unit between said forwardly moving conveyor and said separating means, where culls and trash are removed and discharged on the ground,
   a second forwardly moving conveyor between said mechanical sorting unit and said separating means for receiving the sorted crop from said mechanical sorting unit,
   a front side conveyor to which the sorted crop is delivered for moving the crop transversely to a delivery point, and
   said first and second forwardly moving conveyors and said mechanical sorting unit all being mounted on a sorter frame that is supported pivotally relative to said main frame along a horizontal longitudinally extending pivot line for folding said sorter frame upwardly against the side of said main frame when the harvester is being transported or stored.

17. The harvester of claim 16 wherein at least one of the wheels supporting said harvester being movable from a position beneath said main frame where it directly supports said main frame to a position beneath said sorter frame when the sorter frame is folded down for use, for direct support by said wheel frame of said sorter frame.

18. The harvester of claim 16 wherein said front side conveyor is mounted pivotally to said main frame about a vertical pivot for swinging in to a position over and generally parallel with said crop pickup means.

19. In a row-crop harvester having a main frame supported by wheels and supporting crop pickup means at a front end followed by and in line with separating means for separating the edible crop from the remainder of the plant and discarding said remainder, and collecting means for collecting the separated edible crop, the combination therewith of
   preinspection means supported by said main frame for receiving the harvested crop from said collecting means, mechanical sorting means for receiving the harvested crop from said preinspection means for separating out culls and trash, post-inspection means receiving the cull-free, trash-free crop from said mechanical sorting means, and delivery means to which the sorted crop is delivered from said post-inspection means for moving the crop to a delivery point.

20. In a row-crop harvester having a main frame supported by wheels and supporting crop pickup means at a front end followed by and in line with separating means for separating the edible crop from the remainder of the plant and discarding said remainder, and collecting means for collecting the separated edible crop, the combination therewith of preinspection means supported by said main frame for receiving the harvested crop from said collecting means, mechanical sorting means for receiving the harvested crop from said preinspection means for separating out culls and trash, post-inspection means receiving the cull-free, trash-free crop from said mechanical sorting means, delivery means to which the sorted crop is delivered from said post-inspection means for moving the crop to a delivery point, and said preinspection means, said mechanical sorting means, and said post-inspection means all being mounted on a sorter frame that is supported pivotally relative to said main frame along a horizontal longitudinally extending pivot line for folding said sorter frame upwardly against the side of said main frame when the harvester is being transported or stored.

21 The harvester of claim 20 wherein at least one of the wheels supporting said harvester is movable from a position beneath said main frame where it directly supports said main frame to a position beneath said sorter frame when the sorter frame is folded down for use, for direct support by said wheel frame of said sorter frame.

22. The harvester of claim 20 wherein said delivery means is mounted pivotally to said main frame about a vertical pivot for swinging in to a position over and generally parallel with said crop pickup means.

23. In a row-crop harvester having a main frame supported by wheels and supporting crop pickup means at a front end followed by and in line with separating means for separating the edible crop from the remainder of the plant and discarding said remainder, and collecting means for collecting the separated edible crop, the combination therewith of preinspection means supported by said main frame for receiving the harvested crop from said collecting means, mechanical sorting means for receiving the harvested crop from said preinspection means for separating out culls and trash, post-inspection means receiving the cull-free, trash-free crop from said mechanical sorting means, delivery means to which the sorted crop is delivered from said post-inspection means for moving the crop to a delivery point, and said preinspection means comprising a rear cross conveyor and said post-inspection means comprising a forwardly moving conveyor to one side of said main frame.

24. The harvester of claim 1 wherein said basic unit has at least three sets of wheels, each set having a separate wheel frame, supporting at least one wheel, two of said sets being rear wheels, means for varying the distance between a first said rear wheel frame and the other said rear wheel frame between a minimum said distance and a maximum said distance, while maintaining substantial alignment of the axle line of said two rear wheel sets, and said first said wheel frame being moved to approximately said maximum distance when said sorting unit is attached to said basic unit and is in unfolded position for harvesting, to give direct support for said sorting unit.